Sept. 25, 1962   K. W. KAMPERT   3,055,719
RECIPROCATING HYDRAULIC MOTOR
Filed Sept. 15, 1961
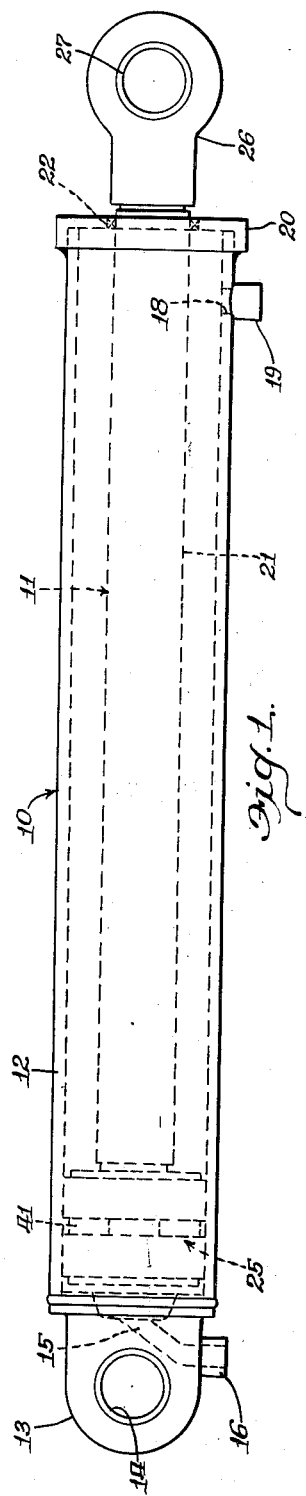
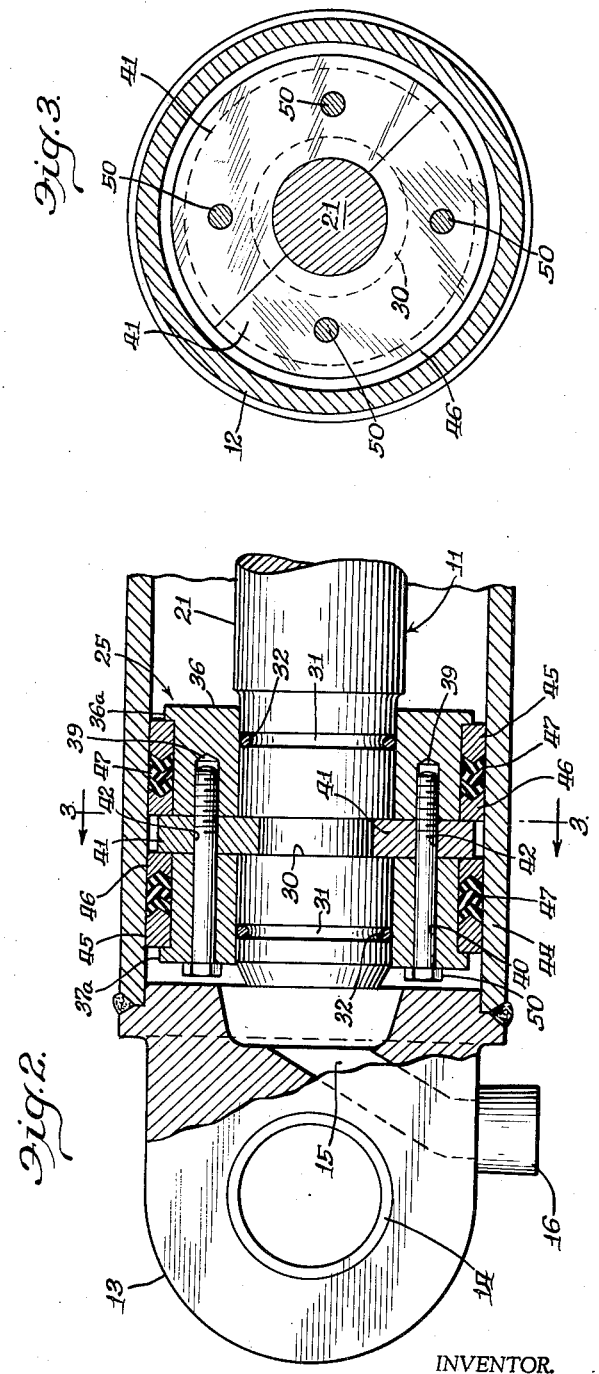
INVENTOR.
Keith W. Kampert
BY Paul O. Pippel
Atty.

United States Patent Office 3,055,719
Patented Sept. 25, 1962

3,055,719
RECIPROCATING HYDRAULIC MOTOR
Keith W. Kampert, Libertyville, Ill., assignor to The Frank G. Hough Co., a corporation of Illinois
Filed Sept. 15, 1961, Ser. No. 138,464
16 Claims. (Cl. 309—4)

This invention relates generally to reciprocating hydraulic motor constructions, and more particularly to piston constructions for a reciprocating hydraulic motor.

The primary object of the invention is to provide a novel piston construction for a reciprocating hydraulic motor which is relatively simple to construct and assemble.

A further object of the invention is to provide a novel piston construction for a hydraulic reciprocating motor of a relatively large size such as used in large earth-moving machines which will efficiently operate under the application of relatively high loading forces.

Still another object of the invention is to provide a novel piston construction for a hydraulic reciprocating motor wherein the piston may easily be dissassembled for repair and replacement of the various parts thereof.

Other objects and features of the present invention will be apparent upon a perusal of the following specification and drawing in which:

FIGURE 1 is a side elevational view of a reciprocating hydraulic motor embodying the present invention;

FIGURE 2 is an enlarged view of a portion of the device shown in FIGURE 1 and taken partially in cross section; and FIGURE 3 is a cross sectional view of the structure shown in FIGURE 2 and taken substantially along the line 3—3 of FIGURE 2.

The present embodiment is the preferred embodiment, but it is to be understood that changes can be made in the present embodiment by one skilled in the art without departing from the spirit and scope of the present invention.

Generally, the present invention comprises a hydraulic reciprocating motor having a cylinder assembly with a piston slidably carried therein for reciprocating movement relative to the cylinder. Hydraulic fluid ports are provided at each end of the cylinder for the connection of hydraulic fluid conduits thereto for operation of the motor.

The novel piston construction comprises the forming of the piston rod at one end thereof with an annular groove which will accept a certain split ring. Two annular piston head sections are provided and are placed on the piston rod one on each side of the split ring. Each piston head section carries a male and a female bearing disposed on each side of and in cooperation with a plurality of sealing rings. Each assembly of male and female bearings and sealing rings are retained between the split ring and an annular shoulder on each piston head portion. The piston head section which is spaced from the end of the piston rod has a plurality of threaded holes therein, and the split ring and the other piston head section are each provided with holes therethrough axially aligned with the threaded holes in the former piston head section. A plurality of bolts is then inserted through the outwardmost piston head section and the split ring, and is threaded into the inwardmost piston head section to draw the two piston head sections to each side of the split ring. The plurality of bolts tightly secures the piston head sections to the split ring. By virtue of the cooperation between the split ring and the annular groove in the piston rod, the entire piston head assembly is securely locked to the piston rod, and any loading on the piston head assembly is transmitted through the split ring to the piston rod.

In detail, the hydraulic reciprocating motor comprises a cylinder assembly 10 and a piston assembly 11 slidably carried therein for relative reciprocating movement therebetween.

The cylinder assembly 10 comprises a cylindrical tube 12 with an internal surface which is relatively smooth. The head end of the cylinder 12 is provided with an end member 13 which is secured over the end of the cylinder 12 by any suitable means such as welding. The end member 13 is provided with a hole therethrough and with a bushing 14 carried on that hole for connection of the head end of the motor in some tool arrangement. The end member 13 is further provided with a passageway 15 extending from a port on the outer surface thereof into a recess which opens into the cylinder 12. A hydraulic fluid conduit 16 is connected to the passageway 15 to provide for the application of hydraulic fluid to the head end of the cylinder 12.

The rod end of the cylinder 12 is provided with a port 18 therethrough for the connection of a hydraulic fluid conduit 19 to deliver hydraulic fluid to the rod end of the cylinder 12. The rod end of the cylinder 12 is also provided with an end member 20 which may be secured thereto by any suitable means. The end member 20 is provided with a hole axially therethrough for the piston rod 21 of the piston assembly 11. Any suitable sealing means, as at 22, is provided between the rod end of the cylinder 12 and the piston rod 21 to permit reciprocation of the piston assembly 11 relative to the cylinder assembly 10 without the leakage of any appreciable amount of hydraulic fluid from between the end member 20 and the piston rod 21.

The piston assembly 11 comprises, in addition to the piston rod 21, a piston head assembly 25 carried on the inner end of the piston rod 21. The outer end of the piston rod 21 is provided with a member 26 having a hole therethrough which carries a bushing 27 for pivotally connecting the motor in a tool arrangement.

The inner end of the piston rod 21 is slightly reduced in diameter from the remaining major portion thereof, and the slightly reduced portion is formed with a substantial annular groove 30 and a pair of sealing grooves 31 disposed one on each side of the annular groove 30. The sealing grooves 31 each carry an O-ring 32.

The piston head assembly 25 further comprises a piston head section 36 and a piston head section 37. The piston head section 36 is cylindrical in shape and has an inner diameter substantially equal to the diameter of the inner end portion of the piston rod 21. An annular shoulder 36a is formed on the outer periphery of the piston head section 36 at one end thereof. The face of the other end of the piston head section 36 is provided with four substantially equally spaced threaded holes 39.

The piston head section 37 is also provided with an inner diameter substantially equal to the diameter of the reduced inner end portion of the piston rod 21. The piston head section 37 is also provided with an annular shoulder 37a on the outer periphery and at one end thereof. The piston head section 37 is provided with four equally spaced holes 40 formed therethrough on axes parallel to the axis of the piston head section 37.

The piston head assembly 25 further comprises a split ring 41. The split ring 41 is formed of two semicircular portions which when placed together define a complete cylindrical ring. The inner diameter of the split ring is substantially equal to the inner diameter of the annular groove 30 in the piston rod 21. The outer diameter of the split ring 41 is greater than the outer diameter of the piston head sections 36 and 37 but less than the inner diameter of the cylinder 12. The split ring 41 is provided with four equally spaced holes 42 formed therethrough on axes parallel to the axis of the spit ring 41.

The piston head sections 36 and 37 and the split ring 41 may be formed of a relatively hard material such as steel.

The piston head assembly 25 further comprises two bearing and sealing means 44. Each bearing and sealing means 44 comprises a male bearing 45, a female bearing 46 and three sealing rings 47. The bearing rings 45 and 46 are formed of a relatively soft material such as bronze, and the sealing rings 47 are formed of a fabric impregnated with a resilient material such as rubber or neoprene. The sealing rings 47 are somewhat V-shaped in cross section and the male bearing ring 45 is formed on one side thereof with a projection conforming to the V-shaped depression on one side of the sealing rings 47. The female bearing ring 46 is provided on one side thereof with a V-shaped depression conforming to the shape of the projecting side of the sealing rings 47. The bearing rings 45 and 46 and the sealing rings 47 have an inner diameter substantially equal to the outer diameter of the piston head sections 36 and 37. The bearing rings 45 and 46 and the sealing rings 47 have an outer diameter substantially equal to the inner diameter of the cylinder 12.

The piston head assembly 25 is initially assembled on the piston rod 21 before the piston rod 21 is inserted in the cylinder 12. The piston head section 36 must be positioned on the piston rod 21 before the split ring 41 is placed in the annular groove 30. Once the piston head section 36 and the bearing and sealing means 44 for that piston head section are assembled as shown in FIGURE 2 the split ring 41 and the other piston head section 37 and its bearing and sealing means 44 may be mounted on the end of the piston rod 21. The split ring 41 is mounted on the piston rod 21 by separating the two portions thereof along the division line thereof and placing each portion in the groove 30 from one side of the piston rod 21. The holes 39, 40, and 42 respectively of the piston head sections 36 and 37 and the split ring 41 are axially aligned and the bolts 50 are inserted through the holes 40 and 42 and threaded into the holes 39 to draw the piston head sections 36 and 37 tightly against each side of the split ring 41. The portion of the spit ring 41 which extends into the groove 30 of the piston rod 21 prevents any axial movement of the piston head assembly 25 relative to the piston rod 21. Each bearing and sealing means 44 is securely maintained against axial movement relative to the piston head sections 36 and 37 by the annular shoulders 36a and 37a and the outer periphery of the split ring 41.

The piston head assembly 25 may easily be replaced merely by removal of the four bolts 50, by separating the split ring 41 into its two portions and by sliding the piston head sections 36 and 37 from the piston rod 21.

The bearing rings 45 and 46 and the sealing rings 47 will cooperate with the inner wall of the cylinder 12 to permit the piston assembly 11 to be reciprocated in the cylinder 12 by the application of hydraulic fluid under pressure to either one of the conduits 16 or 19. The bearing and sealing means 44 will prevent any leakage of fluid from one side of the piston head assembly 25 to the other side thereof, and any loading forces applied to the piston head sections 36 and 37 and the bearing and sealing means 44 will be transmitted through the split ring 41 to the piston rod 21.

Having described the invention what is considered new and desired to be protected by Letters Patent is:

1. A piston assembly for a hydraulic reciprocating motor comprising, a piston rod having an annular groove formed therein and spaced from one end thereof, a pair of piston head sections carried on said rod, a split ring carried in said annular groove and extending radially outwardly thereof, said pair of piston head sections being positioned one on each side of said spit ring, and means for securing said pair of piston head sections to the radially outwardly extending portion of said split ring.

2. A piston assembly for a hydraulic reciprocating motor comprising, a piston rod having an annular groove formed therein and spaced from one end thereof, a pair of piston head sections carried on said piston rod, a split ring carried in said annular groove and extending radially outwardly thereof, said pair of piston head sections being positioned one on each side of said split ring, a plurality of axially aligned holes being formed through one of said pair of said piston head sections and said split ring, a plurality of threaded holes formed in the other of said pair of piston head sections in axial alignment with the plurality of holes of said one piston head section and said split ring, and a plurality of bolts carried through said plurality of holes in said one piston head section and said split ring and threaded into the holes formed in said other piston head section to secure said pair of piston head sections against the radially outwardly extending portion of said split ring.

3. A piston assembly for a hydraulic reciprocating motor comprising, a piston rod having an annular groove formed therein and spaced from one end thereof, a pair of piston head sections carried on said piston rod, a split ring having an inner diameter substantially equal to the inner diameter of said annular groove and a width substantially equal to the width of said annular groove, said split ring having an outer diameter greater than the diameter of said piston rod, said split ring positioned in said annular groove, said pair of piston head sections being positioned one on each side of split ring, and means for securing said pair of piston head sections to said split ring.

4. A piston assembly for a hydraulic reciprocating motor comprising, a piston rod having an annular groove formed therein and spaced from one end thereof, a pair of piston head sections carried on said piston rod, a split ring having an inner diameter substantially equal to the inner diameter of said annular groove and a width substantially equal to the width of said annular groove, said split ring having an outer diameter greater than the diameter of said piston rod, said pair of piston head sections being positioned one on each side of said split ring, a plurality of axially aligned holes being formed through one of said pair of piston head sections and said split ring, a plurality of threaded holes formed in the other of said pair of piston head sections in axial alignment with the plurality of holes of said one piston head section and split ring, and a plurality of bolts carried through said plurality of holes in said one piston head section and split ring and threaded into the holes formed in said other piston head section to secure said pair of piston head sections against the radially outwardly extending portion of said split ring.

5. A piston assembly for a hydraulic reciprocating motor comprising, a piston rod having an annular groove formed therein and spaced from one end thereof, a pair of piston head sections carried on said rod, a plurality of bearing and sealing rings carried on the outer periphery of each of said piston head sections, means at one end of each of said piston head sections retaining said bearing and sealing rings against axial movement relative thereto, a split ring carried in said annular groove and extending radially outwardly thereof beyond the inner diameter of said bearing and sealing rings, said piston head sections being positioned one on each side of said split ring with the other end of each of said piston sections engaging said split ring, and means for securing said pair of piston head sections to the radially outwardly extending portion of said split ring.

6. A piston assembly as defined in claim 5, wherein said bearing and sealing ring retaining means at one end of each of said piston head sections comprises an annular shoulder integrally formed with said piston head sections.

7. A piston assembly for a hydraulic reciprocating motor comprising, a piston rod having an annular groove formed therein and spaced from one end thereof, a pair of piston head sections carried on said piston rod, a plurality of bearing and sealing rings carried on the outer periphery of said piston head sections, means at one end of each of said piston head sections retaining said bearing and sealing rings against axial movement relative thereto, a split ring carried in said annular groove and extending radially outwardly thereof beyond the inner diameter of said bearing and sealing rings, said pair of piston head sections being positioned one on each side of said split ring with the other ends of said piston head sections engaging said split ring, a plurality of axially aligned holes being formed through one of said pair of piston head sections and said split ring, a plurality of threaded holes formed in said other end of the other of said pair of piston head sections in axial alignment with the plurality of holes of said one piston head section and split ring, and a plurality of bolts carried through said plurality of holes in said one piston head section and said split ring and threaded into the holes formed in said other piston head section to secure said pair of piston head sections against the radially outwardly extending portion of said split ring.

8. A piston assembly as defined in claim 7, wherein said bearing and sealing ring retaining means on one end of said piston head sections comprises an annular shoulder integrally formed on each of said piston head sections.

9. A piston assembly for a hydraulic reciprocating motor comprising, a piston rod having an annular groove formed therein and spaced from one end thereof, a pair of piston head sections carried on said piston rod, a plurality of bearing and sealing rings carried on the outer periphery of each of said piston head sections, means at one end of each of said piston head sections retaining said bearing and sealing rings against axial movement relative thereto, a split ring having an inner diameter substantially equal to the inner diameter of said annular groove and a width substantially equal to the width of said annular groove, said split ring having an outer diameter greater than the outer diameter of said piston head sections, said split ring positioned in said annular groove, said pair of piston head sections being positioned one on each side of said split ring with the other ends of said piston head sections engaging said split ring, and means for securing said piston head sections to said split ring.

10. A piston assembly as defined in claim 9, wherein said bearing and sealing ring retaining means on one end of each of said piston head sections comprises an annular shoulder integrally formed on the outer periphery of each of said piston head sections.

11. A piston assembly for a hydraulic reciprocating motor as defined in claim 10, wherein said bearing and sealing rings have an outer diameter substantially equal to the inner diameter of the cylinder of said hydraulic reciprocating motor, said split ring having an outer diameter less than the inner diameter of said cylinder, and said annular shoulders on said piston head sections having an outer diameter less than the inner diameter of said cylinder.

12. A piston assembly for a hydraulic reciprocating motor comprising, a piston rod having an annular groove formed therein and spaced from one end thereof, a pair of piston head sections carried on said piston rod, a plurality of bearing and sealing rings carried on the outer periphery of each of said piston head sections, means at one end of each of said piston head sections retaining said bearing and sealing rings against axial movement relative thereto, a split ring having an inner diameter substantially equal to the inner diameter of said annular groove and a width substantially equal to the width of said annular groove, said split ring having an outer diameter greater than the outer diameter of said piston head sections, said split ring positioned in said annular groove, said pair of piston head sections being positioned one on each side of said split ring with the other ends thereof engaging said split ring, a plurality of axially spaced holes being formed through one of said pair of piston head sections and said split ring, a plurality of threaded holes formed in said other end of said other of said pair of piston head sections in axial alignment with the plurality of holes of said one piston section and said split ring, and a plurality of bolts carried through said plurality of holes in said one piston head section and split ring and threaded into the holes formed in said other piston head section to secure said pair of piston head sections against the radially outwardly extending portion of said split ring.

13. A piston assembly as defined in claim 12, wherein said bearing and sealing ring retaining means at one end of each of said piston head sections comprises an annular shoulder integrally formed on said one end of each of said piston head sections.

14. A piston assembly as defined in claim 13, wherein said piston head sections have an inner diameter substantially equal to the diameter of said piston rod at said one end thereof.

15. A piston assembly for a hydraulic reciprocating motor as defined in claim 14, wherein said bearing and sealing rings have an outer diameter substantially equal to the inner diameter of the cylinder of said reciprocating motor, and said annular shoulders and said split ring each have an outer diameter less than the inner diameter of said cylinder.

16. A piston assembly as defined in claim 12, wherein said plurality of axially aligned holes in said piston head sections and said split ring comprise equally spaced holes in each of said piston head sections and said split ring, and said plurality of bolts comprises bolts carried through said plurality of holes in said piston head sections and said split ring.

No references cited.